(12) United States Patent
Bauer et al.

(10) Patent No.: US 7,124,088 B2
(45) Date of Patent: Oct. 17, 2006

(54) APPARATUS FOR INTERNET ON-LINE INSURANCE POLICY SERVICE

(75) Inventors: Alan R. Bauer, Mill Valley, CA (US); Amanda L. Bowman, Bedford, OH (US); Richard J. Keyser, Euclid, OH (US); Megan N. McNamara, Rocky River, OH (US); Cheryl L. Urminski, Cleveland Heights, OH (US); Leslie Youngstrom, Sacramento, CA (US); Toby Alfred, Orange, OH (US)

(73) Assignee: Progressive Casualty Insurance Company, Mayfield Village, OH (US)

( * ) Notice: Subject to any disclaimer, the term of this patent is extended or adjusted under 35 U.S.C. 154(b) by 0 days.

(21) Appl. No.: 09/364,803

(22) Filed: Jul. 30, 1999

(65) Prior Publication Data

US 2002/0116228 A1    Aug. 22, 2002

(51) Int. Cl.
*G06Q 40/00* (2006.01)
(52) U.S. Cl. ........................................ 705/4
(58) Field of Classification Search .............. 705/4, 705/35; 283/54; 902/5; 709/217
See application file for complete search history.

(56) References Cited

U.S. PATENT DOCUMENTS

| | | | |
|---|---|---|---|
| 4,831,526 A * | 5/1989 | Luchs et al. ................. | 364/401 |
| 5,797,134 A | 8/1998 | McMillan et al. | |
| 5,809,478 A * | 9/1998 | Greco et al. .................... | 705/4 |
| 5,845,256 A * | 12/1998 | Pescitelli et al. .............. | 705/4 |
| 5,956,691 A * | 9/1999 | Powers .......................... | 705/4 |
| 6,869,362 B1 * | 3/2005 | Walker et al. ................. | 463/25 |

FOREIGN PATENT DOCUMENTS

GB        935208 A2 * 11/1999
WO        WO 20052616 A2 * 9/2000

OTHER PUBLICATIONS

Pasher, Auto Web site takes off, Mar. 1998, National Underwriter (Propert & Casualty/Risk & Benefits Management), vol. 102 No. 11, pp. 9 and 16.*
Festa, For Insurance Sales, Turn to the 'Web', Aug. 1998, Insurance Regulator, vol. 5 No. 31, p. 1.*
Business Editors, Electric Insurance Joins Intuit's Quicken InsureMarket Offering Online Auto Policies in 6 States, Dec. 1998, Business Wire.*
Schori et al., A level playing field, Apr. 1998, LIMRA's MarketFacts, vol. 17 No. 2, pp. 48-49.*
Rodgers, Hawaii insurer finds an opal in the rough, May 1999, Insurance & Technology, vol.24 No. 5, p. 27.*
Esurance Launches New Car Insurance Program, May 2002, PR Newswire.*

* cited by examiner

*Primary Examiner*—Joseph Thomas
*Assistant Examiner*—Christopher L. Gilligan
(74) *Attorney, Agent, or Firm*—Brinks Hofer Gilson & Lione

(57) ABSTRACT

An Internet on-line insurance policy service system that facilitates real-time automated communication of policy information, adjustment of policy parameters, calculation and communication of resulting policy quotes, and implementation of policy changes, while obviating insurer personnel involvement and supervision of the communication. The system comprises a plurality of software modules relating to on-line real-time communication of existing policy information, testing of a wide range of variations in policy parameters, computing and communicating changes in policy premiums that would result from such variations, communicating desired changes in policy parameters and implementing desired policy changes. Other modules relate to communication of claims information and the providing of on-line forms.

41 Claims, 6 Drawing Sheets

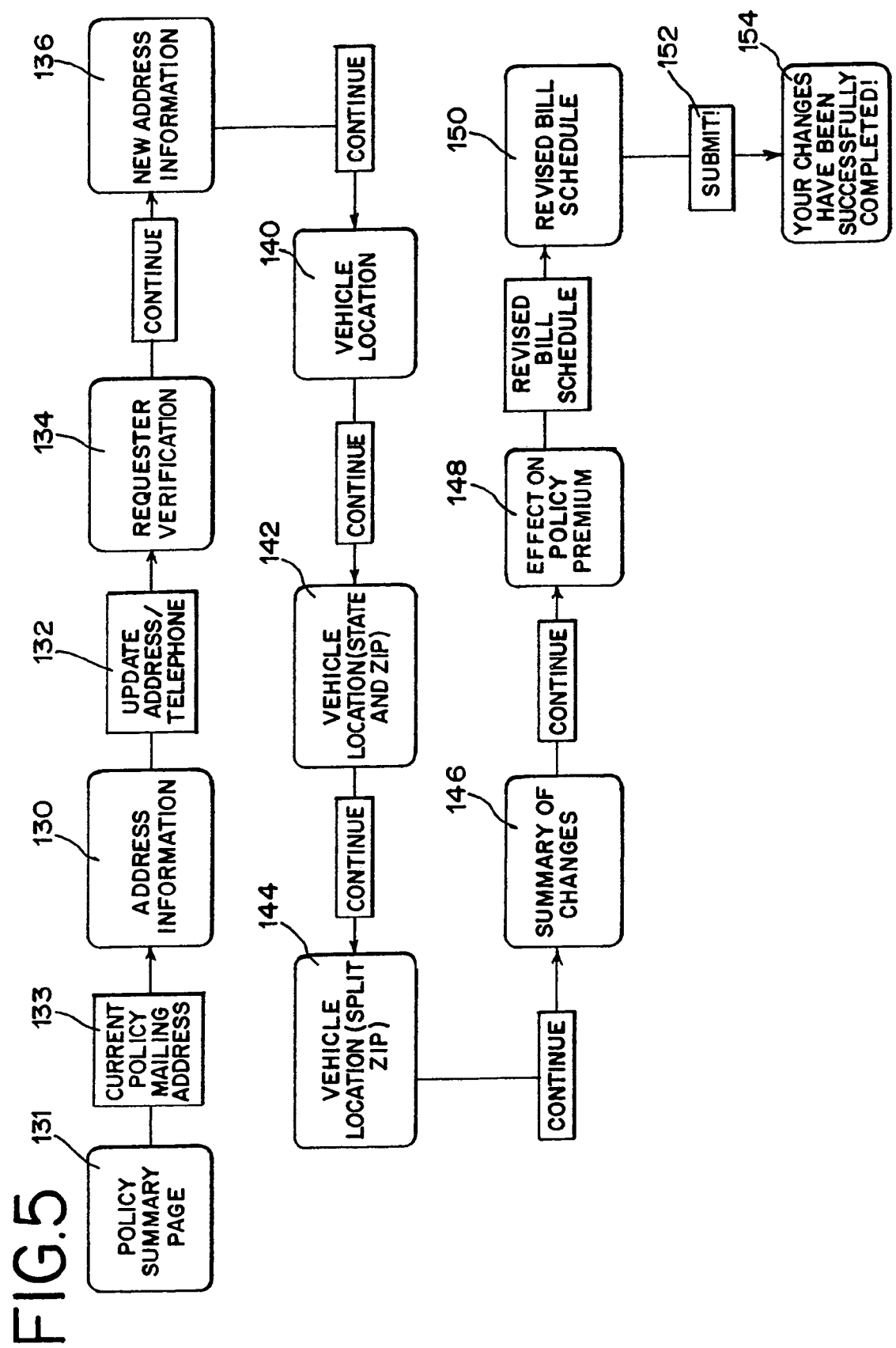

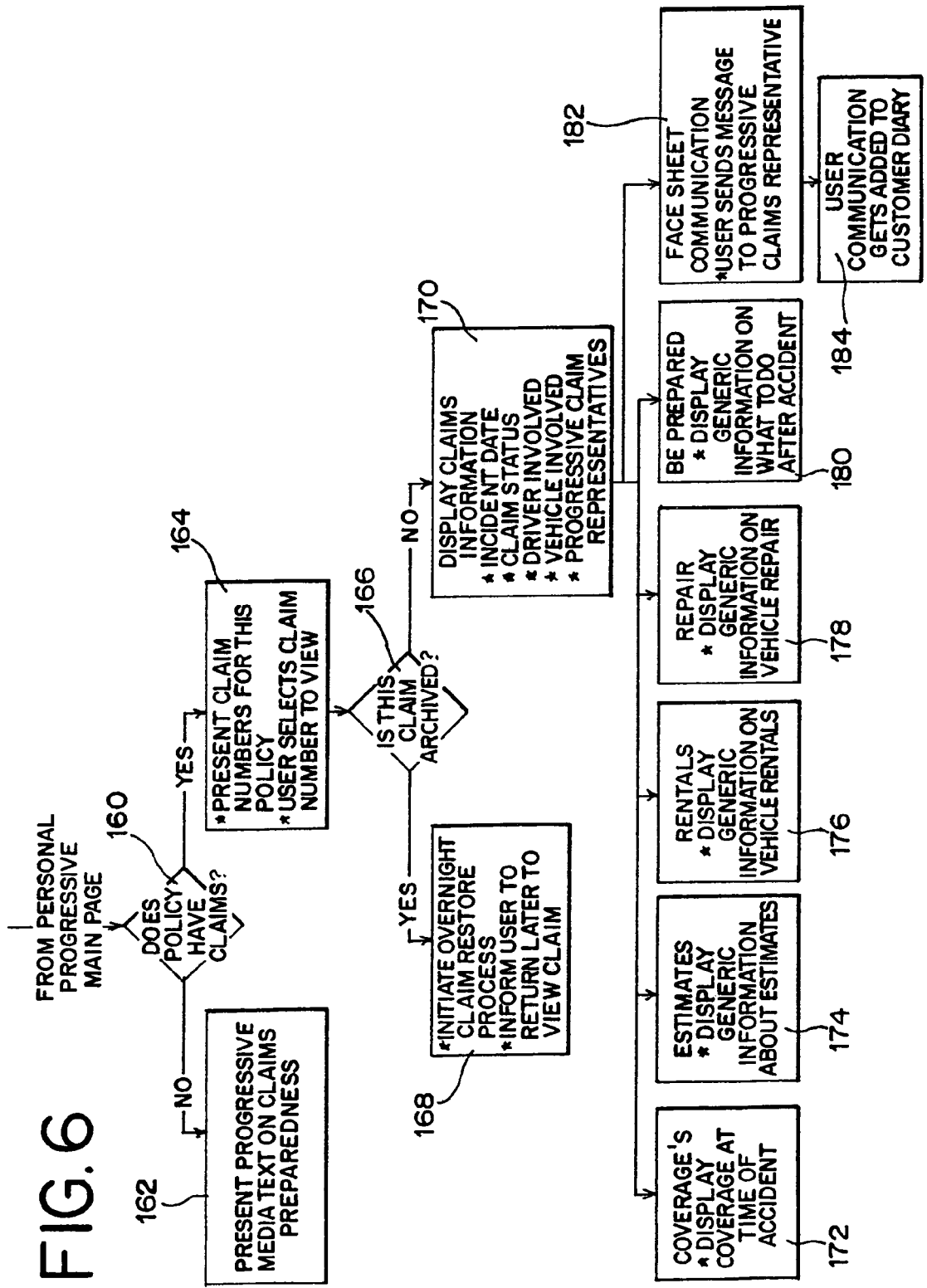

US 7,124,088 B2

APPARATUS FOR INTERNET ON-LINE INSURANCE POLICY SERVICE

BACKGROUND OF THE INVENTION

The present invention relates to data communication and processing systems, and particularly to a system for automated Internet on-line communication of proposed and actual changes to insurance policy parameters, assessing cost consequences of such proposed and actual changes, updating the insured's policy file and implementing desired policy changes, while avoiding insurer personnel involvement in the communication, updating and policy amendment process.

As used in this application, the term "Internet" means the global computer information system both as it exists currently and as it may change, evolve or develop over time and including any replacement or successor systems.

Vehicle insurance policies are now a legal requirement for driving rights in most jurisdictions and nearly all drivers own or are required to own some type of insurance. Conventional methods for acquiring such a policy usually entail relatively lengthy application processes between the buyer and a personal representative of the insurer such as either an insurance company salesperson or an independent agent for the company. The application process requires a communication of personal and historical data of the buyer and whatever vehicles are involved and their locations to allow the insurer to classify the prospective applicant in predetermined actuarial classes and for quoting a cost to the applicant. In addition, for existing customers of the insurance company, changes in policy parameters such as changes in residence, the vehicle locations, number of household drivers or acquisition of new or replacement of old vehicles covered by the policy require regular communication between the customer and the insurer or its agents. When such communication is required to be handled in writing, telephonically, or personally by the company representative or independent agent, the time consumption and associated costs for such personal handling can present cost and servicing problems which need to be minimized. Any way that the insurer can reduce personnel involvement in addressing policyholder services is a way that can improve efficiency and reduce costs—costs that can be eliminated to result in lower rates to a consumer buying the insurance.

The present invention contemplates a new and improved insurance policy service and delivery system for communicating changes in policy parameters to an insurer via an Internet on-line automated system, thereby obviating representative or agent personal involvement in the interfacing and communicating of policy parameter changes, policy changes and associated charge adjustments between the customer and the insurer.

A BRIEF SUMMARY OF THE INVENTION

In accordance with the present invention, there is disclosed a method and apparatus for Internet on-line insurance policy service and delivery for real-time automated selective adjustment by a user of policy parameters, and for system computation and communication of resulting cost adjustments due to the policy parameter changes. The system comprises an information module for identifying a user to the system and for communicating currently existing policy parameters to the policyholder. A policy adjustment module selectively communicates parameter changes made by the user to the insurer's computer system and the computer then generates in real-time the resulting policy cost attributable to the parameter change. The cost adjustments can be communicated in the form of a quote, and if the computer is so instructed by the user, the policy change and related cost adjustment can be formally submitted and implemented.

In accordance with more limited aspects of the invention, the system further includes a claims information module for communicating information relative to claims processing, and a funds transfer module for on-line payment of accounts by a user.

In accordance with yet another aspect of the present invention, the parameter changes can comprise, for example, a change in garage location of the vehicle being insured or the personal residence of the holder of the policy, a change in the vehicles insured under the policy, the addition or deletion of one or more drivers under the policy or changes in coverages, deductible amounts or policy limits.

One benefit of the present invention is a more efficient handling of policyholder services to reduce inconvenience to the insurance customer and to reduce handling and involvement requirements of insurer personnel to attend to such services, thereby reducing overhead costs and ultimately providing an ability to insure policyholders on a more cost effective basis.

Another benefit of the subject invention is a reduction in the time cycle for communicating and implementing policy changes thereby assuring a more accurate coverage and minimizing time periods when the policy parameter changes are not properly incorporated into the policy.

Other benefits and advantages of the subject new policy service will become apparent to those skilled in the art upon a reading and understanding of the specification.

BRIEF DESCRIPTION OF THE DRAWINGS

The invention may take physical form in certain parts and steps and arrangements of parts and steps, the preferred embodiments of which will be described in detail in the specification and illustrated in the accompanying drawings which form a part hereof and wherein:

FIG. 5 is a flow diagram of the steps of implementing a policy change due to an address or telephone change; and FIG. 6 is a flow diagram of communicating claims information from the system.

DETAILED DESCRIPTION OF THE INVENTION

Figure 1:
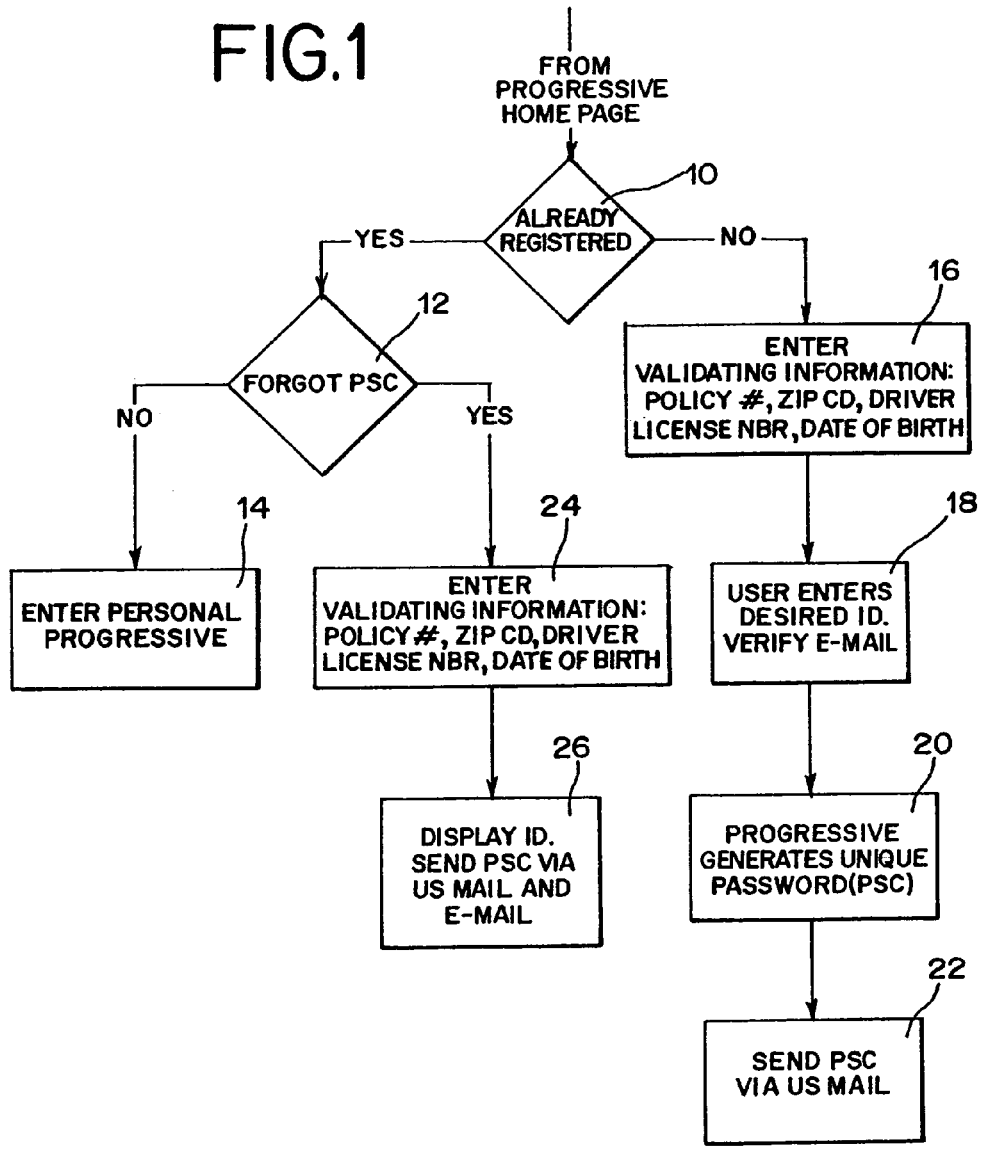
FIG. 1 is a flow diagram for accessing the subject system with a personal security code.

The subject invention is related to a data processing system especially applicable to the insurance industry wherein a policyholder can, through Internet on-line accessing, view and update his or her particular policy information. After the policyholder/customer authenticates himself/herself, the system retrieves the verification, or other information requested by the policyholder from the system and displays it to the policyholder via the Internet. A user-friendly interface guides the customer through various activities including, without limitation, billing information, making a payment via a credit card or on-line check, policy information, state specific contract information, quoting an endorsement for vehicle replacement, address changes and claims information. The system displays the premium amount and variance and updates the customer file at the customer's request, without need for personal handling by an individual representative of the insurer or an independent agent. Most of the information presented to the customer is specific to that customer's policy only and is, of course, maintained confidential through a security code system and transferred/viewed via a secure server. Generic information generally describing the policy is also provided. The subject invention uniquely provides on-line viewing and updating of the customer's existing information and facilitates real-time updating of the policy parameters and the ability to implement policy changes on-line. Although discussed with primary reference to automobiles as the insured vehicle, the invention is applicable to any other type of insured item, i.e., boats, airplanes, personal or real property or any other thing that is subject to an insurance policy, as well as to other kinds of insurance that may be provided, such as life, disability, medical, dental, credit insurance and general liability insurance.

The subject system contains four critical areas or modules of content with the capability of expansion to additional product and policy services: policy information, policy updating, claims information and payment enablement via electronic funds transfer. The following outline details these modules and the subsequent detailed description of the invention will follow along this outline.

I. Policy Information Displayed for the Specific Policyholder Includes:

A. Billing and Account Information
Account status
Amount and receipt date of the last payment
Amount and receipt date of the renewal payment (if applicable)
Current amount due and due date
Bill schedule
Account payment history B. Policy Details
Mailing address
Listed drivers, age, gender, driver type and proof of financial responsibility status
Driving records for each driver listed on policy
Year, make, model and vehicle identification number (VIN #) for each vehicle listed on the policy
State policy contract valid for the specific policy
Agent of record name, address and phone number C. Coverages and Premiums
Coverage limits listed by vehicle
Premium displayed by coverage and vehicle
Policy fees and taxes for total policy:

II. Payment Functionality Includes
Account status
Amount and receipt date of the last payment
Amount and receipt date of the renewal payment (if applicable)
Select a payment amount of either the current amount due, current amount and renewal payment, an amount entered that is greater than the minimum amount due or pay in full
Select payment method of on-line check or credit card III. Policy Updates Include the Following:

A. Vehicle Replacement
Selection of which vehicle on the policy the insured wants to replace
Selection of year, make, model and submodel the insured wants to quote
Selection for physical damage coverages specific for the vehicle being quoted
Listing of resultant premium change over the rest of the policy term
Comparison of premium over the entire policy term
Ability to update the policy for the vehicle replacement
Revised billing schedule
Quote summary of all quotes obtained by the customer B. Vehicle Addition
Selection for year, make, model and submodel the insured wants to add to the policy
Garaging address, information about the car, and leasing/financing information collected
Selection for physical damage coverages specific for the vehicle being quoted
Listing of resultant premium change over the rest of the policy term
Comparison of premium over the entire policy term
Ability to update the policy for the vehicle replacement
Revised billing schedule
Quote summary of all quotes obtained by the customer C. Address/Telephone Change
Address displayed
Requestor verified
New address/telephone number collected
Update garaging address by vehicle
Listing of resultant premium change over the rest of the policy term
Comparison of premium over the entire policy term
Revised billing schedule
Summary of changes
Ability to update the address/telephone change
If only the telephone number is changed, a declaration page prints and mailings are suppressed D. Order Duplicate Insurance Forms
Order ID cards or ID cards and duplicate declaration page sets IV. Claims Information Includes:
Claim number, incident date and status displayed for selection
Driver and vehicle involved
Location of loss, incident report date/time
Inspection date/time
Determination of total loss
Claim features open
Claim representative name and phone number
Claims office location and street address
Display of coverage at time of incident
Payment history
Information on subornation, if applicable
Total loss information
Estimate information
Rental and vehicle repair
Communications directly to the claim representative's desk top Referring now to the drawings where the showings are for purposes of illustrating the preferred embodiments of the invention only and not for purposes of limiting same, the FIGURES show a method and apparatus for Internet on-line insurance policy servicing.

FIG. 1 is a flow diagram illustrating access to the subject system. A user can access the Internet with any conventional browser program and must first contact the Progressive home page (Progressive refers to Progressive Casualty Insurance Company of Mayfield Village, Ohio, the assignee of the subject application. "Personal Progressive" is the mark identifying a commercially implemented embodiment of the subject invention ) The process flow of FIG. 1 shows the customer can only access the system with a personal security code ("PSC") key. The system will query 10 if the customer has registered a personal security code and if the answer is "yes", the system will query 12 if the customer has forgotten the PSC and, if not, after the appropriate code is entered the customer can enter the system Accompanying this attachment is an Appendix comprising photostats of the on-line displays a customer will encounter while moving through the system. Photostatic images are segregated in accordance with the outline headings above. Such displays can also be directly accessed through the Internet with an on-line personal computer system by typing the URL "http:\\personal.progressive.com". If the initial inquiry receives an answer that the customer does not have a PSC, then the customer must add validating information comprising the customer's policy number, the zip code, a driver's license number, a date of birth and an e-mail address 16. The user next enters 18 an ID code of some kind that is personal to the user and the system will verify the entered ID code via e-mail communication. The system will then generate a unique password (PSC) 20 and the password will be sent 22 to the customer at his home address via U.S. mail. The customer cannot enter the Personal Progressive system until after receipt of the PSC.

If the customer has a PSC, but it has been forgotten, then after the inquiry 12 the customer must enter 24 the validating information sent at step 16 and the system will display the preselected identity code and resend 26 the PSC via U.S. mail and e-mail.

The foregoing steps for inquiring and implementing the PSC are necessary for maintaining the personal confidentiality of any particular customer when accessing the system.

Figure 2:
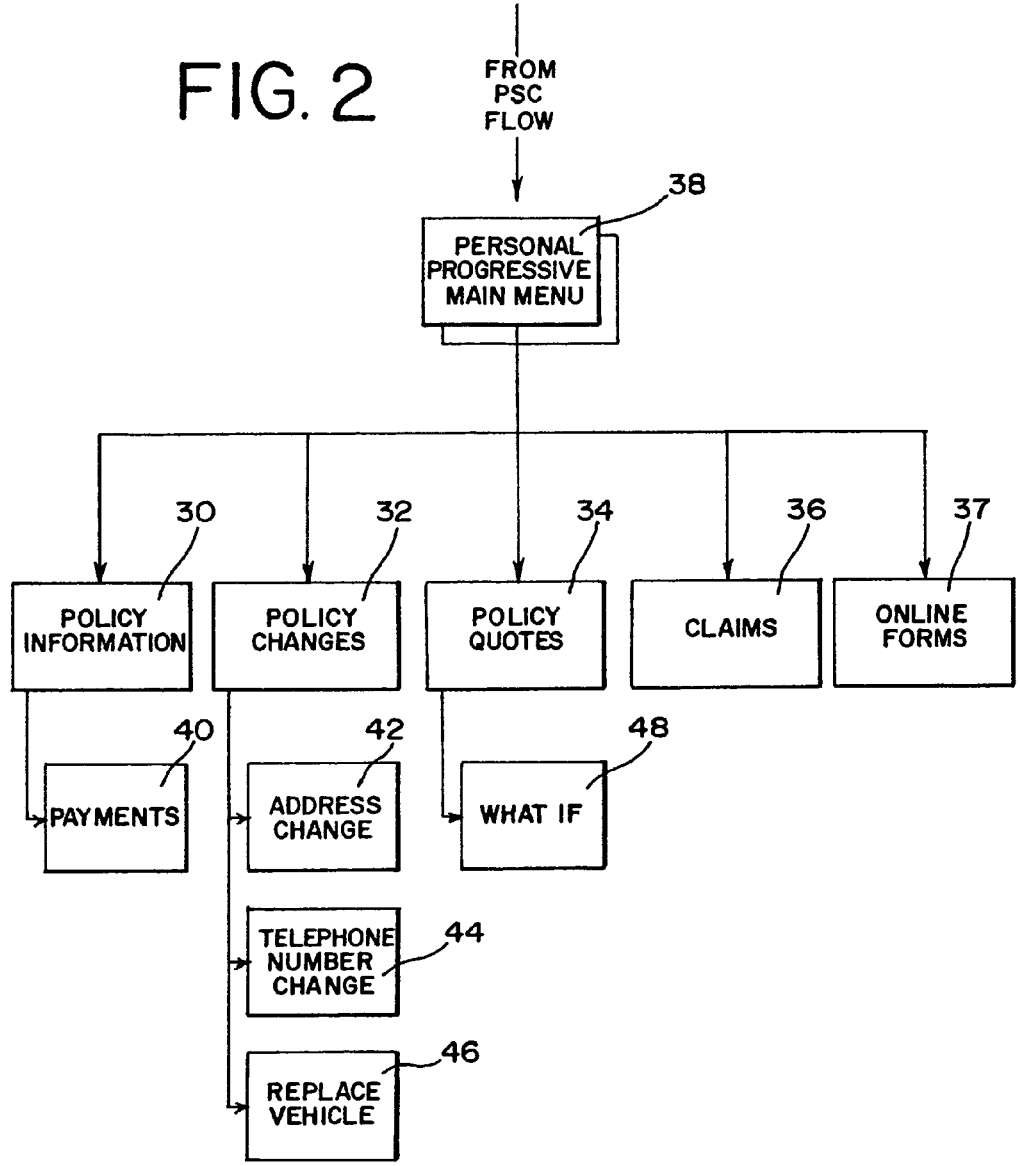
FIG. 2 is a block flow diagram identifying the principal processing modules of the subject invention.

As noted above, the subject system can be segregated into four critical areas of content. With reference to FIG. 2, these comprise policy information 30, policy changes 32, policy quotes 34 and claims information 36. A user can navigate to these particular modules from the Personal Progressive main menu 38 through web pages specifically designed to guide the customer to the desired information through clicks on alternative query marks or through the input of necessary information. Of course, the particular design of the web pages to facilitate the navigation or the customer's responses is a matter of subjective design and those shown in the Appendix, or at the URL address above, merely illustrate one particular convenient and successful page format set. Another module 37 provides the customer the ability to acquire on-line forms typically comprising duplicate insurance forms, such as ID cards and duplicate declaration page sets.

The policy information module 30 displays a variety of billing and account information, policy details and the particular coverage afforded by the cumulative premiums of the policy. The billing and account information comprises a display of the account status, i.e., whether it is active and if the account is paid to date including the amount and the receipt date of the last payment, the amount and receipt date of the renewal payment, if applicable, the current amount due on the due date, the bill schedule and the account payment history. The policy details that can be viewed and verified by the customer include, without limitation, the mailing address, the driver and vehicle information including a list of drivers, their age, gender, driver type and proof of financial responsibility status. The driving record for each driver listed on the policy can also be displayed. The vehicle information includes the year, make, model and VIN # for each vehicle listed on the policy. Other details include, without limitation, a display if there is a state policy contract valid for the customer's specific policy and the name, address and phone number of the agent of record for the customer. The coverage in premiums information comprises a very detailed report of the coverage limits listed by vehicle and the premiums displayed for various types of coverage per vehicle. For example, if three different vehicles were involved, each vehicle would receive a display of what the bodily injury liability premium is for the specified term of the policy as well as various other liability premiums for items such as property damage, uninsured motorist, medical expenses and collisions, etc., i.e., all the conventional premium information that is relevant to any particular policy.

Payments module 40 also comprises a display of some relevant account information such as account status, the amount and receipt date of the last payment, and the amount and receipt date of the renewal payment (if applicable). In addition, though, the customer may select a payment amount via the current amount due, the current amount for the renewal term, pay in full or an amount that must be greater than the minimum amount due. The payment method can be selected as either an on-line check or a credit card.

The policy changes module 32 is primarily comprised of modules for changing the customer's address 42, telephone number 44 or of replacing or adding 46 a vehicle to the policy coverage.

Figure 3:
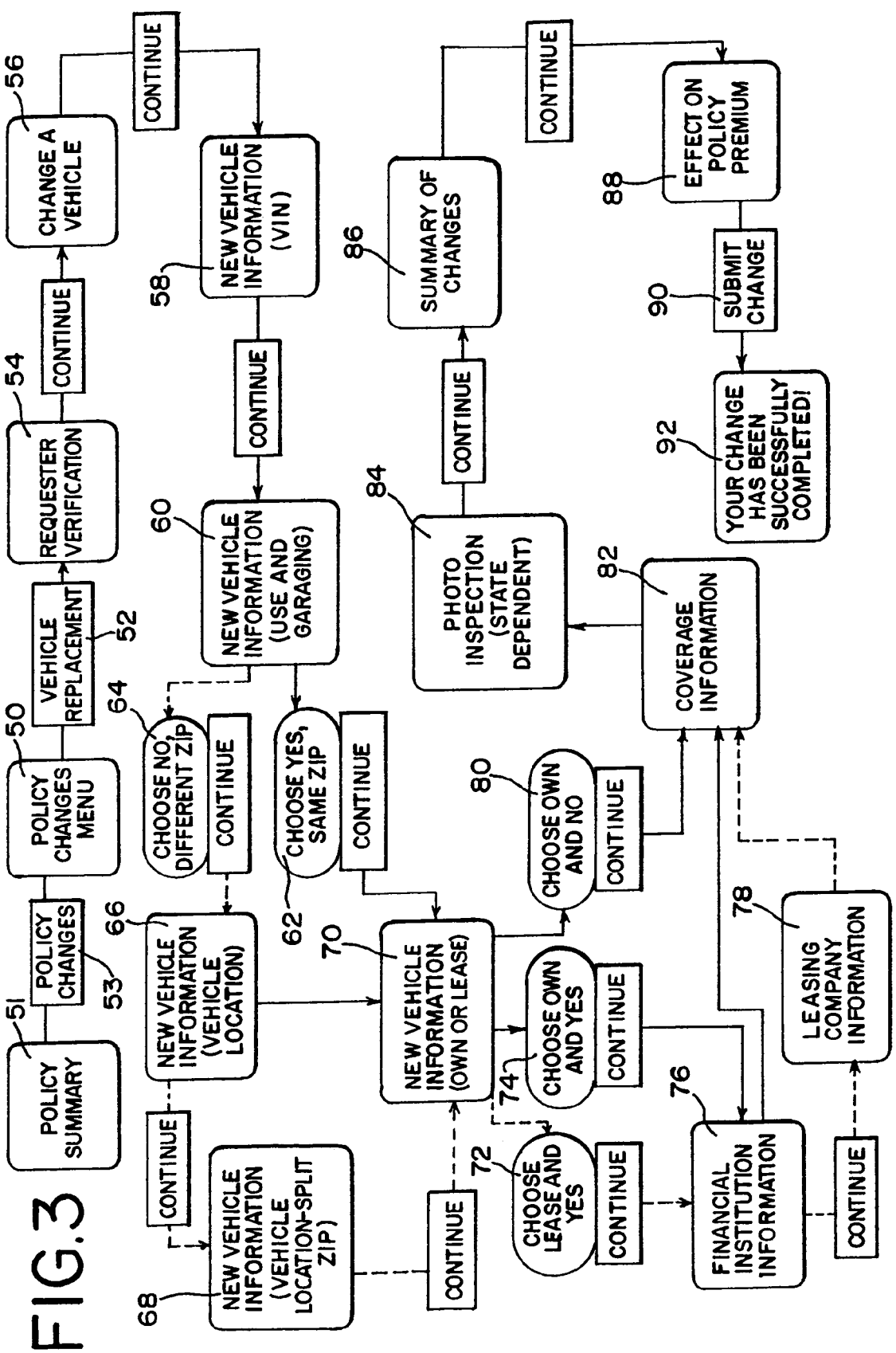
FIG. 3 is a flow diagram illustrating steps for updating a policy change comprising a vehicle replacement.

With reference to FIG. 3, the following steps illustrate the navigation through various web pages that a customer will make to effect a vehicle replacement on the policy. The "continue" boxes can be clicked by the user to move to the next page. Initially, the customer will encounter a policy summary page 51 from which the customer will select the policy changes module 53. The policy changes menu 50 displays an option of vehicle replacement 52 in response to which the customer receives a request for verification page 54. After verification, the customer identifies 56 which vehicle from the policy is to be replaced. The identity of the new vehicle 58 is entered by the customer including the year, make, model, submodel information and VIN #. Additional information 60 relates to the use and garaging, i.e., if the car is a commuter car and whether it will be garaged at the same address as the resident address of the owner 62 or whether it will be garaged at a different address 64. If it is going to be garaged at a different address, then the system will inquire as to the different garaging location 66 or in some states, if there is more than one municipality in a zip code, the customer must indicate the correct municipality in which the vehicle is garaged, i.e., a split zip 68. In either case the system will next inquire if the vehicle is owned or leased 70. If leased 72, or owned 74, and financing payments are necessary, then the system will inquire as to the financial institution receiving the lease or financing payments 76 and the identity of the leasing company 78. After completion of this financial information, or if the vehicle is owned outright 80 by the customer, then the system will inquire as to what particular coverage information is desired for the vehicle 82. The coverage information relates to physical damage coverage such as comprehensive and collision and further coverages such as towing/labor, rental or loan lease are optionally available. As a particular assist to the customer, the system optionally provides general coverage definitions for various types of coverages offered under the subject insurance policy. After the coverage information 82 has been submitted to the system, an inquiry will be made if the vehicle must have a photo inspection 84 pursuant to state/company regulations and information is displayed accordingly. The summary of changes 86 identifies to the customer the current vehicle and its various coverages and the new replacement vehicle and its various coverages along with the date of effectiveness of the supplied policy change and the effect 88 the policy change will have on the premium, i.e., how the change would affect the premium for the remainder of the current policy term and how the change would affect the premium for the entire policy term. At this stage, the customer has only received an estimate and must verify that the change actually should be submitted 90. If submitted, then the summary of changes are again displayed along with the acknowledgment that the changes have been successfully completed 92. Each page has a "cancel" button which takes the customer to a page indicating that "your changes have been discarded", prior to final submission.

Figure 4:
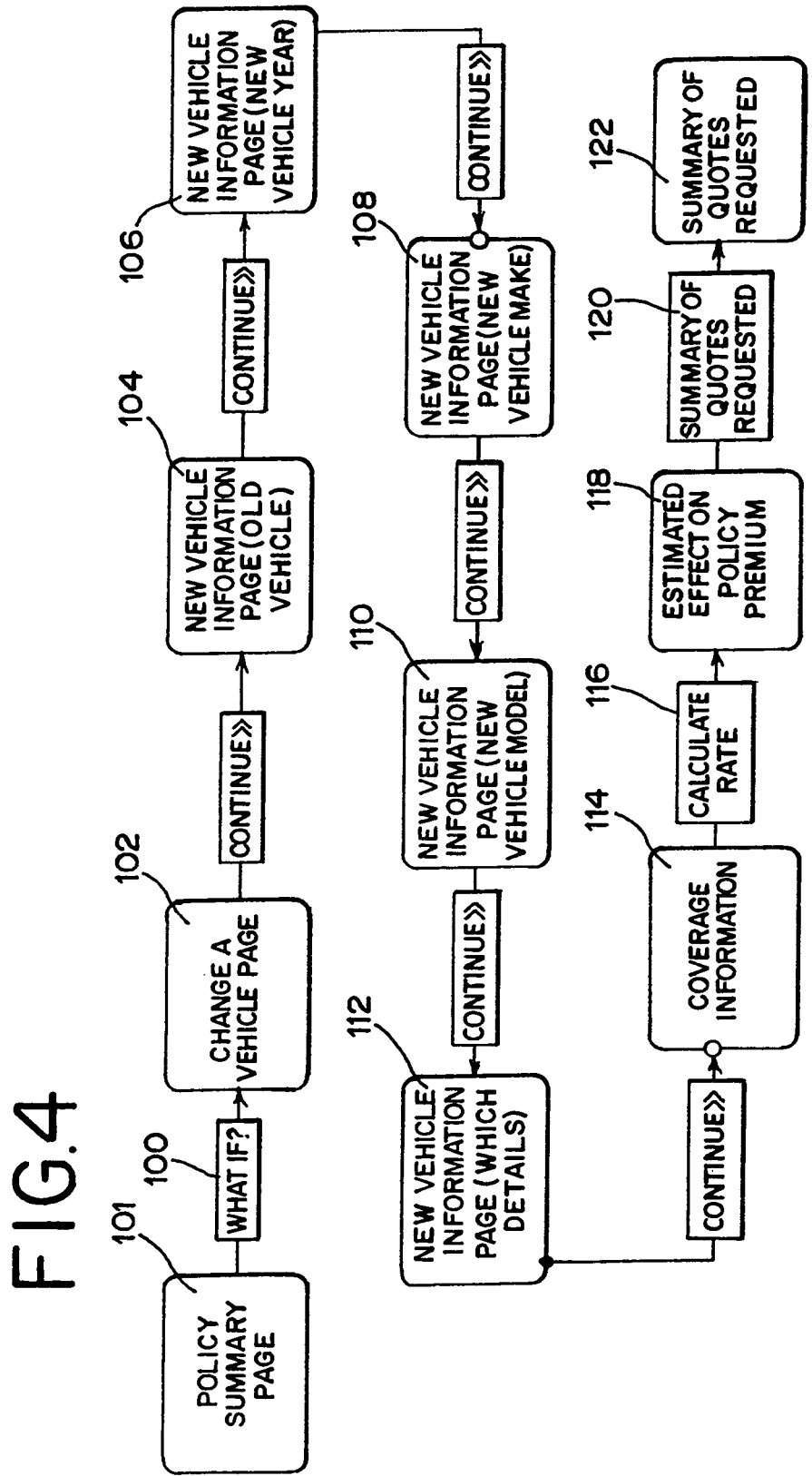
FIG. 4 is a flow diagram of the steps for acquiring an estimate of a rate change resulting from a possible vehicle replacement.

With reference to FIG. 4, often times a customer will merely want to receive a quote before purchasing a vehicle to determine what the insurance cost effect would be if the vehicle had actually been purchased. The policy quotes module 34 (FIG. 2) comprises a "what if" process, currently known as "Policy Quotes", 48 the steps of which are detailed in FIG. 4. Accordingly, after the policy summary 101 is displayed, the customer will click on the "what if" button 100 to indicate that receiving a quote for changing a vehicle is desired. Customers will also be able to reach this functionality via the main menu 38 (FIG. 2). The change of vehicle page 102 continues into a new vehicle information page 104 where the customer selects which of the present vehicles on the policy are expected to be replaced. Alternatively, the customer can specify that the new vehicle is an addition, by indicating that none of the present policy vehicles are intended to be replaced. Important information relative to the new vehicle, such as the vehicle year 106, make 108, and model 110 are solicited prompting a new vehicle information page including system memory of more detailed information indicated by the customer. Such more detailed information relates to body series, body style, engine size, cylinders, wheel drive, and the customer selects the combination of the detailed information 112 which most accurately fits the intended new vehicle. The pertinent coverage information is again solicited 114 from the customer. The current liability coverage is usually indicated to remain the same. The appropriate rate for the new vehicle is calculated at 116. The estimated effect on the policy premium is displayed 118, i.e., either an increase or decrease on the policy premium for the remaining or next period. The customer can request a summary 120 of quotes requested and such summary will be displayed 122.

FIG. 5 illustrates the steps for navigating the address change module 42 or telephone number change module 44.

FIG. 5 starts out similar to FIGS. 3 and 4 in that from the policy summary page 131 the customer must indicate that he is interested in the policy change module 133 and in particular dealing with address and telephone information 130. Customers will also be able to reach this functionality via the main menu 38 (FIG. 2). The customer indicates that he wants to update the address or telephone information 132. The user then verifies 134 his identity, identifies the new address information 136 and further identifies 138 if the vehicle will be located at the same location 140 or if it will be garaged at a different location 142 and in some cases selects the appropriate municipality in a zip code 144. A summary of changes is displayed to the user 146 and the effect such address changes have on the policy premium 148. The customer then inquires as to the effect that the change would have on the bill schedule and a display 150 identified by installment date and due date of the difference between the current policy rates and the new rates as a result of the address change. The customer can then submit the changes 152 and the system will acknowledge that the changes have been successfully completed to the policy 154.

All the foregoing changes in the policy parameters, i.e., addition of vehicles, replacement of vehicles, changes in vehicle locations, or changes in customer locations, are communicated and implemented without any assistance, supervision or involvement of a personal representative of the insurance company. The customer navigates the modules to effect the changes to the policy With particular reference to FIG. 6, it is another advantage of the system that claims information can be communicated to a customer when a claim has been made against the policy. For example, if the insured vehicle was involved in an accident, the customer has the ability with the present invention to monitor on-line the handling of the claim. In particular, if the customer selects the claims module 36 (FIG. 2) from the Personal Progressive main menu, the customer could inquire 160 if there are currently any claims on the policy. If not, the system can present an informative text on claims preparedness 162. If there has been a claim, an identifying claim number for the claim is displayed relating to incident date and whether the claim status is active or inactive. The customer can select a particular claim number for viewing 164. When a claim number is selected, the system will inquire if the claim is archived 166 to a separate storage location and if so, the relevant information must be restored to the system, usually in an overnight process, and the customer is informed to return 168 at a later time to view the desired claim information. If not archived, then the display presents detailed claim information relating to the driver and vehicle involved, the location of loss, the incident report date/time, the inspection date/time, determination of losses, whether the other claim features are yet open and the identity of the claim representative comprising the representative's name and telephone number. Additional information can be presented relating to the claims office location and street address. Other pertinent information relating to the claim relates to coverages 172 comprising a display of the coverage provided by the policy at the time of the accident or other loss, estimate information 174 for repair or reimbursements, and rental information 176 relating to vehicle rentals for temporarily providing transportation after being involved in the accident or other loss. Other information relates to repairs to the vehicle involved 178 and generic information about what to do after an accident or other loss 180. This system displays a face sheet communication allowing the customer to send a message to the claims representative of whatever information the customer feels important 182 and the customer message is added automatically 184 to the diary pertaining to this particular claim. An important advantage of the claims module 36 is its ability to allow a customer to communicate directly to the representative's desk top diary after having full access to relevant information relating to the claim.

The invention has been described with reference to preferred embodiments. Obviously, modifications and alterations will occur to others upon a reading and understanding of the specification. It is our intention to include all such modifications and alterations insofar as they come within the scope of the appended claims or the equivalents thereof.

We claim:

1. An on-line insurance policy service system comprising:
   a web browser for accessing remote insurance information by an insurance policyholder and software linked to the remote insurance information;
   a publicly accessible distributed network for transferring data from the web browser;
   an information module, remote from the web browser coupled to the publicly accessible distributed network, that identifies the insurance policyholder and verifies an insurance policy parameter of an existing insurance policy of the insurance policyholder in real-time in response to first data received from the insurance policyholder through the publicly accessible distributed network and the web browser;
   where the first data comprises a personal security code that allows access to insurance policy parameters of the insurance policyholder;
   an insurance policy adjustment module, remote from the web browser coupled to the publicly accessible distributed network, that adjusts the insurance policyholder's insurance policy parameter in real-time in response to second data received from the insurance policyholder through the publicly accessible distributed network and the web browser,
   where the second data comprises a selection of the insurance policy parameter;
   where the insurance policy adjustment module provides an acknowledgement to the web browser in response to the adjustment of the selected insurance policy parameter within the existing insurance policy, and implements the adjustment to the existing insurance policy; and
   where an insurer's computer generates an insurance document customized to the insurance policyholder as identified by the personal security code and sends the customized insurance document to the web browser in response to the second data received from the insurance policyholder through the publicly accessible distributed network and the web browser.

2. The system of claim 1 where the publicly accessible distributed network comprises a plurality of gateways that use an Internet protocol to facilitate a communication between the web browser and the information module.

3. The system of claim 1 where the insurance policy adjustment module provides the acknowledgment to the web browser after the insurance policy adjustment module implements the adjustment to the existing insurance policy.

4. The system of claim 1 where the Insurance policy adjustment module provides the acknowledgment to the web browser before the insurance policy adjustment module implements the adjustment to the existing insurance policy.

5. The system of claim 4 where the insurance policy adjustment module implements the adjustment to the existing insurance policy in response to third data received from the insurance policyholder through the publicly accessible distributed network and the web browser.

6. The system of claim 4 where the acknowledgement comprises data related to the adjustment of the selected insurance parameter.

7. The system of claim 4 where the acknowledgement comprises a summary of the adjustment of the selected insurance parameter.

8. The system of claim 7 where the summary describes a change in at least one of an insurance coverage, an insurance deductible, or a policy limit an insurance company will pay under an insurance coverage.

9. The system of claim 4 where the acknowledgement comprises a price of the adjustment to the selected insurance policy parameter.

10. The system of claim 9 where the price is related to a change in at least one of an insurance coverage, an insurance deductible, or a policy limit an insurance company will pay under an insurance coverage.

11. The system of claim 9 where the price is related to a change in at least one of a change in a party insured, an item insured, or an address.

12. The system of claim 1 further comprising a payment module coupled to the insurance policy adjustment module.

13. The system of claim 12 where the payment module is remote from the web browser.

14. The system of claim 12 where the payment module comprises an account-based system that allows the on-line insurance policy service system to receive on-line payments through the publicly accessible distributed network.

15. The system of claim 14 where the account based system allows the insurance policyholder to send an on-line payment through the publicly accessible distributed network comprising the Internet.

16. The system of claim 12 where the payment module facilitates payment of an insurance cost through an electronic funds transfer.

17. The system of claim 12 where the payment module comprises an account-based system that allows The on-line insurance policy service system to receive electronic fund transfer payments and credit card payments through the publicly accessible distributed network.

18. The system of claim 12 where the payment module facilitates payment of an insurance cost through a credit card.

19. The system of claim 1 where the customized insurance document comprises content resident to the insurer's computer and content received from the insurance policyholder through the publicly accessible distributed network and the web browser.

20. The system of claim 1 where the web browser generates data that specifies a transmission protocol and receives data from a memory of the insurer's computer.

21. The system of claim 1 where the insurance document comprises a web page.

22. The system of claim 21 where the insurance document comprises data generated by the insurer's computer that is associated with graphics.

23. The system of claim 21 where the insurance document comprises a data file generated by the insurer's computer.

24. The system of claim 1 where the adjustment of the selected insurance policy parameter comprises a change in an item or items insured under the existing insurance policy.

25. The system of claim 1 further comprising a claims information module that communicates claim processing information to the web browser.

26. The system of claim 1 further comprising a claims information module coupled to the information module that sends information to the web browser related to a status of an insurance claim.

27. The system of claim 1 where the adjustment of the selected insurance policy parameter comprises a change in an insurance coverage.

28. The system of claim 1 where the adjustment of the selected insurance policy parameter comprises a change of an address.

29. The system of claim 1 where the adjustment of the selected insurance policy parameter changes the party insured under the existing insurance policy.

30. The system of claim 29 where the party insured comprises a person insured under the existing insurance policy.

31. The system of claim 1 where the adjustment of the selected insurance policy parameter comprises changing the selected insurance policy parameter or a party insured under the existing insurance policy.

32. The system of claim 1 where the adjustment of the selected insurance policy parameter comprises receiving information about a party to be insured under the existing insurance policy.

33. The system of claim 1 where the adjustment of the selected insurance policy parameter adjusts a deductible.

34. The system of claim 1 where the existing insurance policy comprises a vehicle insurance policy.

35. The system of claim 1 where the publicly accessible distributed network comprises the Internet.

36. The system of claim 1 where the personal security code comprises a password.

37. The system of claim 36 where the password comprises a unique string of characters that identifies the insurance policyholder.

38. The system of claim 1 where the first data is received through a web page.

39. The system of claim 1 further comprising a policy quote module coupled to the publicly accessible distributed network to generate an insurance rate quote.

40. The system of claim 1 where the information module provides insurance information to the web browser through the publicly accessible distributed network.

41. The system of claim 40 where the insurance information comprises on-line forms.

* * * * *

(12) EX PARTE REEXAMINATION CERTIFICATE (9276th)

United States Patent
Bauer et al.

(10) Number: US 7,124,088 C1
(45) Certificate Issued: Sep. 4, 2012

(54) APPARATUS FOR INTERNET ON-LINE INSURANCE POLICY SERVICE

(75) Inventors: Alan R. Bauer, Mill Valley, CA (US); Amanda L. Bowman, Bedford, OH (US); Richarad J. Keyser, Euclid, OH (US); Megan N. NcNamara, Rocky River, OH (US); Cheryl L. Urminski, Cleveland Heights, OH (US); Leslie Youngstrom, Sacramento, CA (US); Toby Alfred, Orange, OH (US)

(73) Assignee: Progressive Casualty Insurance Company, Mayfield Village, OH (US)

Reexamination Request:
No. 90/011,612, Mar. 31, 2011

Reexamination Certificate for:
Patent No.: 7,124,088
Issued: Oct. 17, 2006
Appl. No.: 09/364,803
Filed: Jul. 30, 1999

(51) Int. Cl.
*G06Q 40/00* (2006.01)

(52) U.S. Cl. .......................................................... 705/4
(58) Field of Classification Search .................... None
See application file for complete search history.

(56) References Cited

To view the complete listing of prior art documents cited during the proceeding for Reexamination Control Number 90/011,612, please refer to the USPTO's public Patent Application Information Retrieval (PAIR) system under the Display References tab.

*Primary Examiner* — Jeffrey Carlson

(57) ABSTRACT

An Internet on-line insurance policy service system that facilitates real-time automated communication of policy information, adjustment of policy parameters, calculation and communication of resulting policy quotes, and implementation of policy changes, while obviating insurer personnel involvement and supervision of the communication. The system comprises a plurality of software modules relating to on-line real-time communicaton of existing policy information, testing of a wide range of variations in policy parameters, computing and communicating changes in policy premiums that would result from such variations, communicating desired changes in policy parameters and implementing desired policy changes. Other modules relate to communicaton of claims information and the providing of on-line forms.

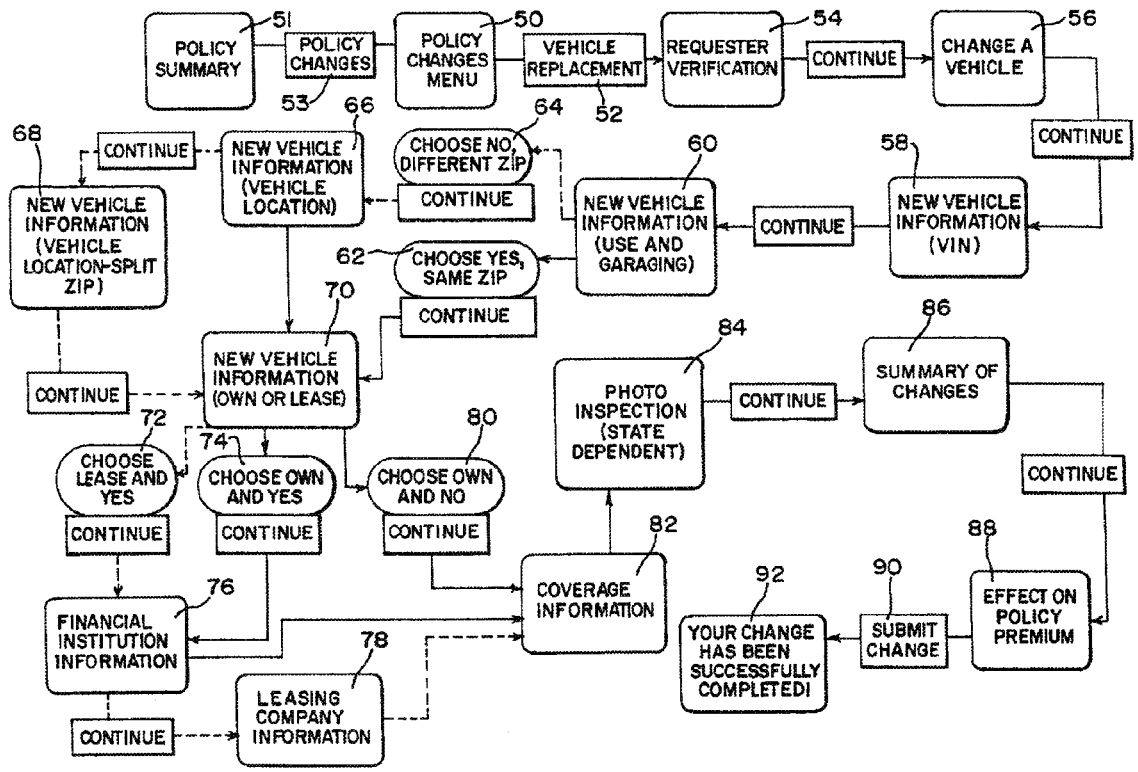

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1-41 is confirmed.

New claims 42-46 are added and determined to be patentable.

*42. The system of claim 1 where the insurance policy adjustment module is further configured to generate in real-time an insurance policy cost adjustment attributable to the adjustment of the insurance policyholder's insurance policy parameter, and where the insurance policy adjustment module is also further configured to communicate the insurance policy cost adjustment in real-time in the customized insurance document sent to the insurance policyholder over the publicly accessible distributed network.*

*43. The system of claim 1 where the adjustment of the insurance policy parameter further comprises an adjustment to an insurance deductible or policy limit associated with the existing insurance policy; and*

*where the insurance policy adjustment module is further configured to generate an insurance policy cost adjustment attributable to the adjustment of the insurance deductible or policy limit, and where the insurance policy adjustment module is also further configured to communicate the insurance policy cost adjustment to the insurance policyholder over the publicly accessible distributed network in real-time in the customized insurance document.*

*44. The system of claim 1 further comprising a claims information module coupled to the publicly accessible distributed network and a payment enablement module coupled to the publicly accessible distributed network.*

*45. The system of claim 1 further comprising a claims information module coupled to the publicly accessible distributed network and a policy quotes module coupled to the publicly accessible distributed network.*

*46. The system of claim 1 further comprising a claims information module coupled to the publicly accessible distributed network, a payment enablement module coupled to the publicly accessible distributed network, and a policy quotes module coupled to the publicly accessible distributed network.*

\* \* \* \* \*